W. L. & T. Winans,
Shaft Coupling,
No. 57,835. Patented Sep. 4, 1866.
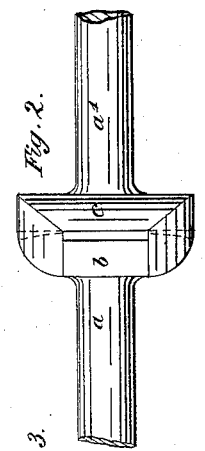
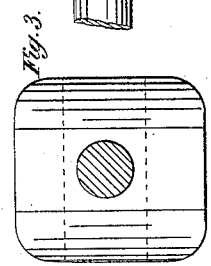
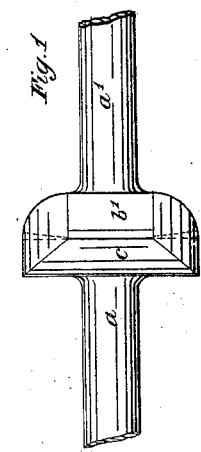
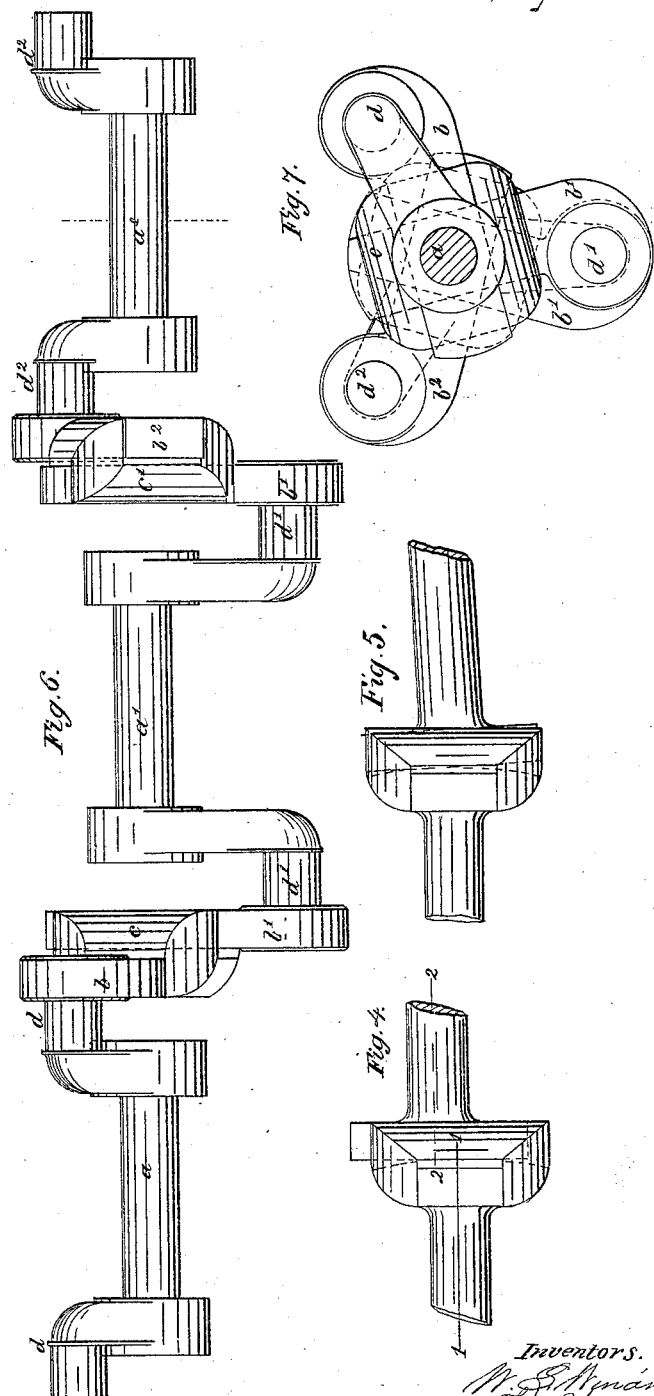

UNITED STATES PATENT OFFICE.

WILLIAM LOUIS WINANS, OF LONDON, ENGLAND, AND THOMAS WINANS, OF BALTIMORE, MARYLAND.

IMPROVED COUPLINGS FOR PROPELLER-SHAFTS OF SHIPS.

Specification forming part of Letters Patent No. 57,835, dated September 4, 1866.

*To all whom it may concern:*

Be it known that we, WILLIAM LOUIS WINANS, of London, England, and THOMAS WINANS, of Baltimore, Maryland, United States of America, have invented Improvements in Couplings for Propelling-Shafts of Ships or Vessels; and we do hereby declare that the following is a full and exact description of our said invention.

Our invention of improvements in couplings for propelling-shafts of ships or vessels has for its object to construct and arrange couplings in such a manner that should the shafting, from any cause, get out of a straight line, there will not be any undue strain or wear and tear on the bearings.

In carrying out the invention the coupled ends of the shafts are provided with cross-pieces, which are arranged at right angles to each other, and are inserted in recesses or grooves made in or attached to a coupling-plate. When the shafts are in a continuous right line the cross-pieces will not move in the recesses of the coupling-plate, but all the parts will rotate on the same longitudinal axis, but should the two shafts get out of a straight line, then, as the shafts rotate, the cross-pieces would have a slight motion in the grooves of the coupling-plate, in order to compensate for the eccentric position of the shafts.

In the accompanying drawings, Figure 1 is a plan view, Fig. 2 a side elevation, and Fig. 3 an end view, of one of our improved couplings.

It will be seen that on the end of each shaft $a\ a'$ is welded or otherwise secured a T-piece, $b\ b'$, which fits into a groove or recess cut or made in a coupling plate or block, $c$. The shafts $a\ a'$ are so mounted in their bearings that the T-piece of the one shaft crosses at right angles the T-piece of the other shaft, the grooves in the coupling plate or block being made at right angles to each other to suit the position of the T-pieces, as shown in Fig. 3, in which the position of the T-piece of the shaft that is not seen is indicated by the dotted lines. The dotted lines in Figs. 1 and 2 indicate the longitudinal axes of the two shafts $a$ and $a'$, and in these figures the axial line of the two shafts is coincident. Should, however, any lateral or vertical displacement of either shaft take place, and the axial lines of the two shafts be no longer coincident, as shown by the lines 1 1 and 2 2 in Fig. 4, the T-piece of the displaced shaft will alter its position in the groove of the coupling-block to suit the altered circumstances. This T-piece will, therefore, project on one side of the coupling-block, as shown in the figure. Should the displacement happen in an oblique direction, so that the axial line is bent at the coupling-block, one end of the T-piece will rise out of the groove in the coupling-block, as shown in Fig. 5; but in all the cases the rotary motion of the shafts may be continued without in any way straining the bearings in which they are mounted beyond the strain caused by the friction due to the pressure upon and the sliding upon one another of the surfaces in contact of the couplings and return-cranks or T-pieces.

For the proper working of the several parts the T-pieces and the grooves of the coupling-block in which they are fitted must be arranged at right angles, as already stated; but in adapting the invention to marine engines, and also for some other purposes where three cranks are used, it will be obvious that the arrangement already described must be somewhat modified to suit the case. Supposing, for example, it be desired to couple three shafts, provided with cranks placed at an angle of one hundred and twenty degrees to each other, the crank-pins must be set so far out of the center of the T-pieces as to compensate for the difference between one hundred and twenty degrees and the right angle or ninety degrees of the grooves in the coupling-block. The way in which we manage this will be understood by referring to Figs. 6 and 7.

The driving-shaft is seen at $a$, $a'$, and $a^2$, and is mounted in suitable bearings placed on the cylinder-heads, or on a framing attached thereto. It will be seen that the shaft is divided into three parts, $a\ a'\ a^2$, and is provided with three sets of cranks, $d\ d'\ d^2$, each of which carries a cross-piece, $b$, $b'$, or $b^2$, equivalent to the T-pieces $b$ in the former figures. These cross-pieces are fitted to grooves in the coupling-blocks $c\ c'$, precisely as in the former instance, but as the cranks are arranged at an angle of one hundred and twenty degrees to each other, as seen in the transverse section, Fig. 7, and as it is necessary that the cross-pieces should be placed at right angles to each other, it follows that the crank-pins must be arranged eccentrically on the cross-pieces, as shown in the figure. From this it will be understood that the coupling-blocks act precisely as in the instance shown in Figs. 1, 2, 3, 4, and 5, and that, should any displacement of any of the sections $a$, $a'$, or $a^2$ of the shaft take place, such displacement will be compensated for and the several parts allowed to adjust themselves in the manner already explained and shown in Figs. 4 and 5.

Having now described our invention of improvements in couplings for propelling-shafts of ships or vessels, and having explained the manner of carrying the same into effect, we claim as our invention.

Coupling shafts by means of a block or plate provided with grooves, in which are inserted cross-pieces or T-pieces attached to the ends of the shafts to be coupled, as herein set forth.

In witness whereof we, the said WILLIAM LOUIS WINANS and THOMAS WINANS, have hereunto set our hands and seals this 20th day of January, 1866.

THOMAS WINANS. [L. S.]
WM. L. WINANS. [L. S.]

Witnesses:
OSMAN LATROBE,
  45 *Clarges Street, London.*
F. H. HAMBLETON,
  45 *Clarges Street, London.*